US010521166B2

(12) United States Patent
Asai

(10) Patent No.: US 10,521,166 B2
(45) Date of Patent: Dec. 31, 2019

(54) COMPUTER-READABLE STORAGE MEDIUM FOR OPERATING TERMINAL, INFORMATION PROCESSING APPARATUS SELECTIVELY TRANSMITTABLE OF INFORMATION TO A SERVER, AND SYSTEM INCLUDING THE INFORMATION PROCESSING APPARATUS AND THE OPERATING TERMINAL

(71) Applicant: BROTHER KOGYO KABUSHIKI KAISHA, Nagoya, Aichi (JP)

(72) Inventor: Norihiko Asai, Tajimi (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 16/143,585

(22) Filed: Sep. 27, 2018

(65) Prior Publication Data
US 2019/0102122 A1 Apr. 4, 2019

(30) Foreign Application Priority Data
Sep. 29, 2017 (JP) ................................ 2017-189973

(51) Int. Cl.
G06F 15/00 (2006.01)
G06F 3/12 (2006.01)
G06K 1/00 (2006.01)
H04N 1/00 (2006.01)

(52) U.S. Cl.
CPC .......... *G06F 3/1232* (2013.01); *G06F 3/1203* (2013.01); *G06F 3/1285* (2013.01); *H04N 1/0001* (2013.01); *H04N 1/00352* (2013.01)

(58) Field of Classification Search
CPC .............. H04N 1/0001; H04N 1/00352; G06F 3/1232; G06F 3/1203; G06F 3/1285
USPC ................................ 358/1.15, 1.13, 1.14, 1.1
See application file for complete search history.

(56) References Cited

U.S. PATENT DOCUMENTS

2009/0249420 A1* 10/2009 Kim .................... H04L 12/2807 725/115
2019/0018852 A1* 1/2019 Ohishi .............. G06F 16/90335

FOREIGN PATENT DOCUMENTS

JP 2006-202028 A 8/2006

* cited by examiner

*Primary Examiner* — Douglas Q Tran
(74) *Attorney, Agent, or Firm* — Scully, Scott, Murphy & Presser, P.C.

(57) ABSTRACT

A non-transitory computer readable storage medium storing computer readable instructions that are executable by a computer in an operating terminal is provided. The computer readable instructions, when executed by the computer, cause the computer to designate an information processing apparatus to transmit apparatus information to a server, and based on the designation of the information processing apparatus, transmit a setting command to the designated information processing apparatus through a communication interface. The setting command commands the information processing apparatus to shift to one of a condition for transmitting the apparatus information to the server and a condition for not transmitting the apparatus information to the server.

25 Claims, 12 Drawing Sheets

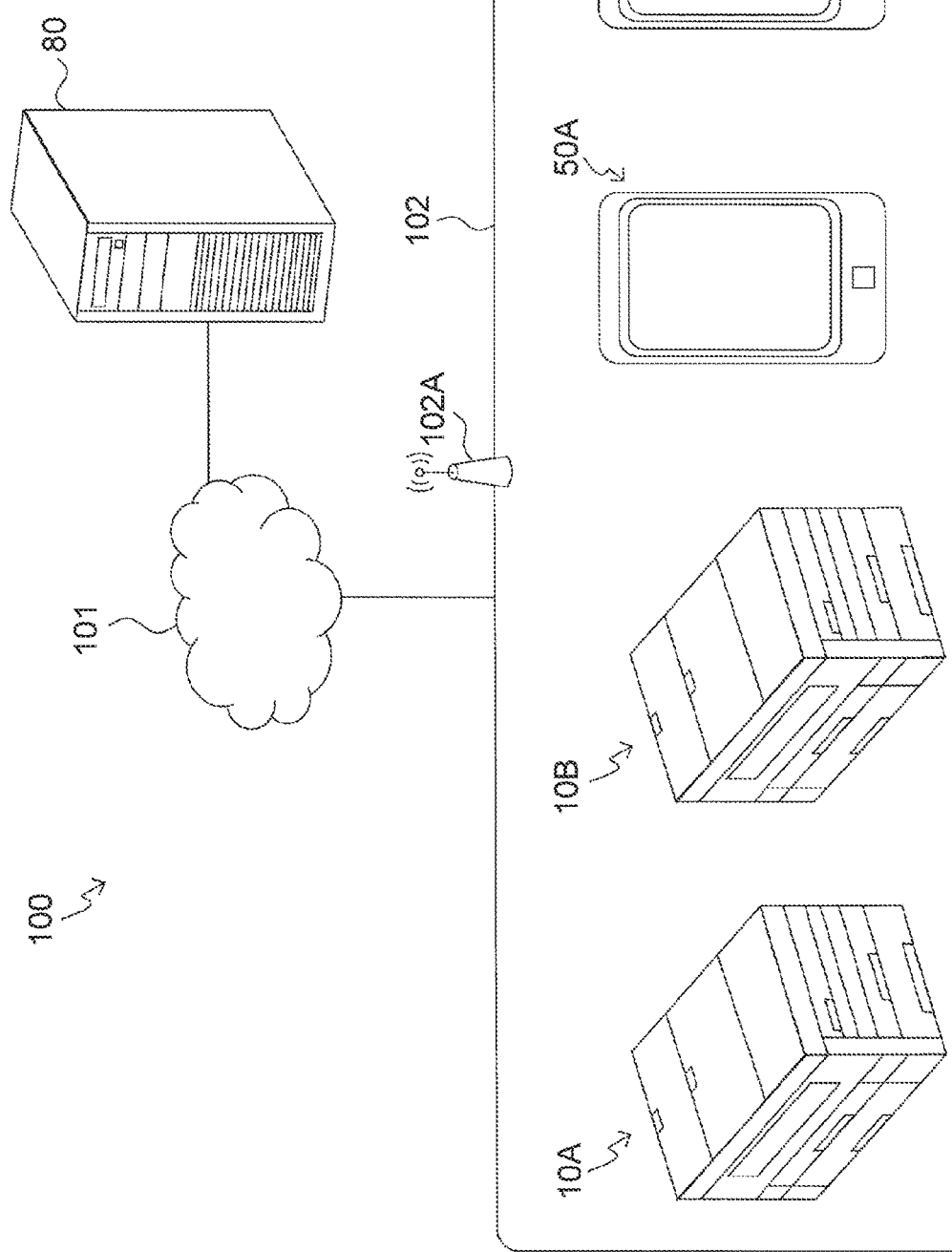

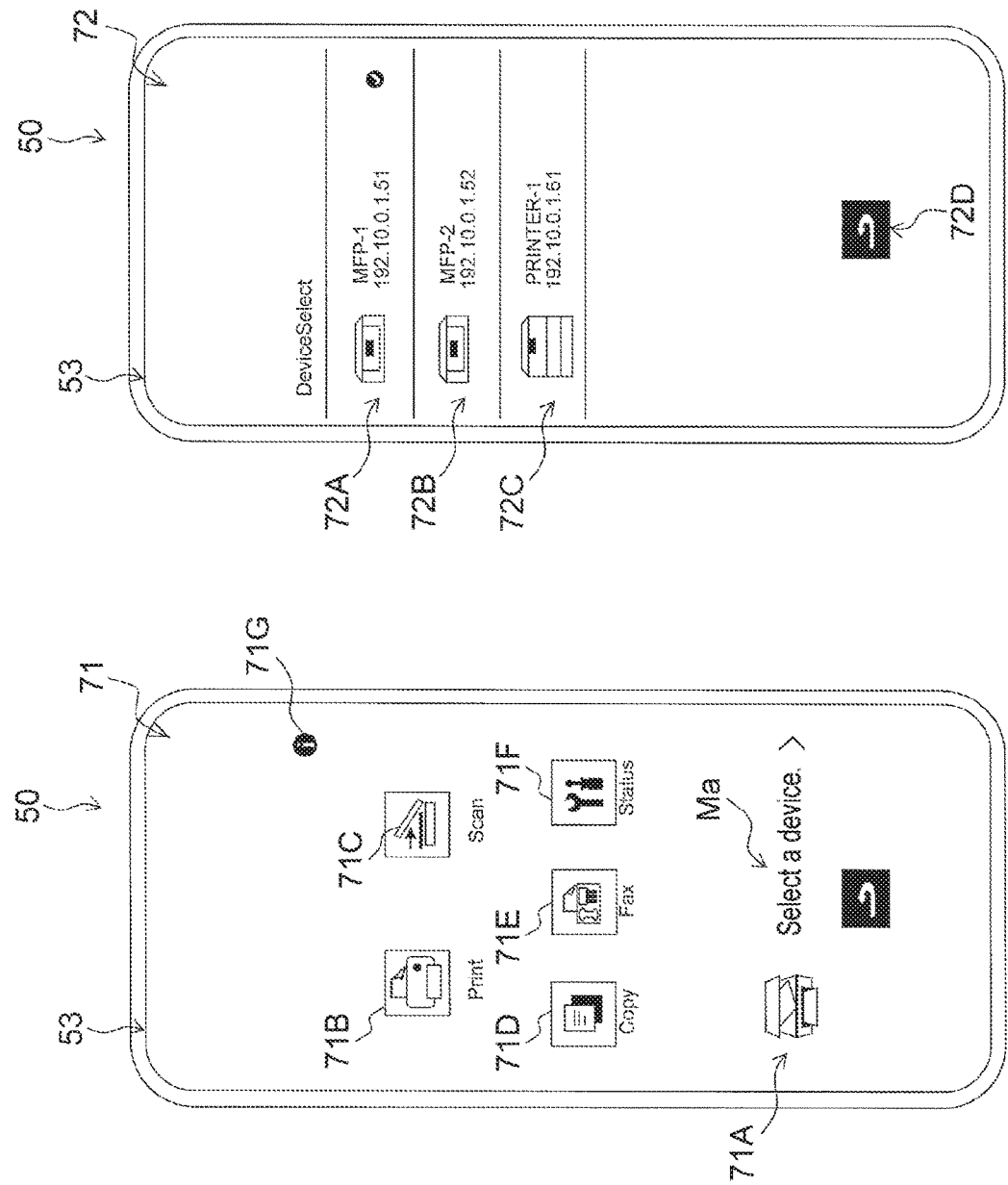

COMPUTER-READABLE STORAGE MEDIUM FOR OPERATING TERMINAL, INFORMATION PROCESSING APPARATUS SELECTIVELY TRANSMITTABLE OF INFORMATION TO A SERVER, AND SYSTEM INCLUDING THE INFORMATION PROCESSING APPARATUS AND THE OPERATING TERMINAL

CROSS REFERENCE TO RELATED APPLICATION

This application claims priority from Japanese Patent Application No. 2017-189973, filed on Sep. 29, 2017, the entire subject matter of which is incorporated herein by reference.

BACKGROUND

Technical Field

Aspects of the present disclosure are related to a computer-readable storage medium to store a program to be executed in an operating terminal that communicates with an information processing apparatus capable of transmit information concerning the information processing apparatus to a server, the information processing apparatus, and a system including the operating terminal and the information processing apparatus.

Related Art

An information processing terminal such as a multifunction peripheral, connectable with a server and an operating terminal, is known. In order to, for example, monitor actions and conditions in the information processing apparatus, and to forecast timing to refill consumable materials in the information processing apparatus, apparatus information concerning the information processing apparatus including user information and user operation records may be provided to the server so that some difficult situations in the information processing apparatus, which may not be overcome by a user alone, may be remedied by aid of the server.

SUMMARY

In order to enable the information processing apparatus to transmit the apparatus information to the server, it may be necessary to instruct the information processing apparatus to enable a setting in the information processing apparatus to transmit the apparatus information to the server by instructing operations. Further, in a case where the apparatus information should no longer be provided to the server, it may be necessary to disable the setting in the information processing apparatus by instructing operations.

Meanwhile, a user I/F provided by the information processing apparatus, such as an operation panel, may not always be optimized: e.g., displayed contents may be visually difficult to recognize, or buttons and keys may be too small for some users, and some users may find them difficult or inconvenient to handle.

The present disclosure is advantageous in that a computer-readable storage medium, an information processing apparatus, and a system, which may enable a user to easily set an information processing apparatus to transmit apparatus information to a server, and the information processing apparatus, are provided.

According to an aspect of the present disclosure, a non-transitory computer readable storage medium storing a computer readable program including computer readable instructions that are executable by a computer in an operating terminal, is provided. The operating terminal has an operation interface, a display, and a communication interface configured to communicate with an information processing apparatus. The information processing apparatus is capable of transmitting apparatus information concerning the information processing apparatus to the server. The computer readable instructions, when executed by the computer, cause the computer to designate the information processing apparatus to transmit the apparatus information to the server, and based on the designation of the information processing apparatus, transmit a setting command to the designated information processing apparatus through the communication interface, the setting command commanding the information processing apparatus to shift to one of a condition for transmitting the apparatus information to the server and a condition for not transmitting the apparatus information to the server.

According to another aspect of the present disclosure, an information processing apparatus, having a communication interface configured to communicate with a server and an operating terminal and a controller, is provided. The controller is configured to receive a setting command from the operating terminal through the communication interface, the setting command commanding the information processing apparatus to shift to one of a condition for transmitting the apparatus information to the server and a condition for not transmitting the apparatus information to the server; and in response to receipt of the setting command from the operating terminal, shift to a commanded condition being one of the condition for transmitting the apparatus information to the server and the condition for not transmitting the apparatus information to the server.

According to another aspect of the present disclosure, a system having an operating terminal and an information processing apparatus is provided. The operating terminal has an operation interface, a terminal communication interface, and a terminal controller. The information processing apparatus has an apparatus communication interface and an apparatus controller. The terminal controller is configured to designate the information processing apparatus to transmit the apparatus information to the server, and based on the designation of the information processing apparatus, transmit a setting command to the designated information processing apparatus through the communication interface, the setting command commanding the information processing apparatus to shift to one of a condition for transmitting the apparatus information to the server and a condition for not transmitting the apparatus information to the server. The terminal controller is configured to receive the setting command from the operating terminal through the terminal communication interface, and in response to receipt of the setting command from the operation terminal, shift to a commanded condition being one of the condition for transmitting the apparatus information to the server and the condition for not transmitting the apparatus information to the server.

BRIEF DESCRIPTION OF THE ACCOMPANYING DRAWINGS

FIG. 1 is an illustrative view of a system according to an embodiment of the present disclosure.

FIGS. 3A-3B illustrate screens to be displayed in the mobile terminal according to the embodiment of the present disclosure.

DETAILED DESCRIPTION

Hereinafter, an embodiment of the present disclosure will be described with reference to the accompanying drawings.

<Overall System Configuration>

As shown in FIG. 1, a system 100 according to the embodiment of the present disclosure includes MFPs 10A, 10B, mobile terminals 50A, 50B, and a server 80. In the following description, the MFPs 10A, 10B may be collectively called as MFP 10, and the mobile terminals 50A, 50B may be collectively called as mobile terminal 50. The MFP 10, the mobile terminal 50, and the server 80 may communicate with one another through a communication network 101. The communication network 101 may be, but not necessarily be limited to, the internet, a wired LAN, a wireless LAN, or a combination of any of these.

For example, the MFP 10 and the mobile terminal 50 may belong to a wireless LAN 102 so that the MFP 10 and the mobile terminal 50 may communicate with one another through access points, which are not shown, in the wireless LAN 102. Meanwhile, the wireless LAN 102 is connected with a communication network 101 through a router 102A. Therefore, the MFP 10 and the mobile terminal 50 may communicate with the server 80 in the communication network 101 through the router 102A.

<Detailed Configuration of the Mobile Terminal>

Figure 2A:
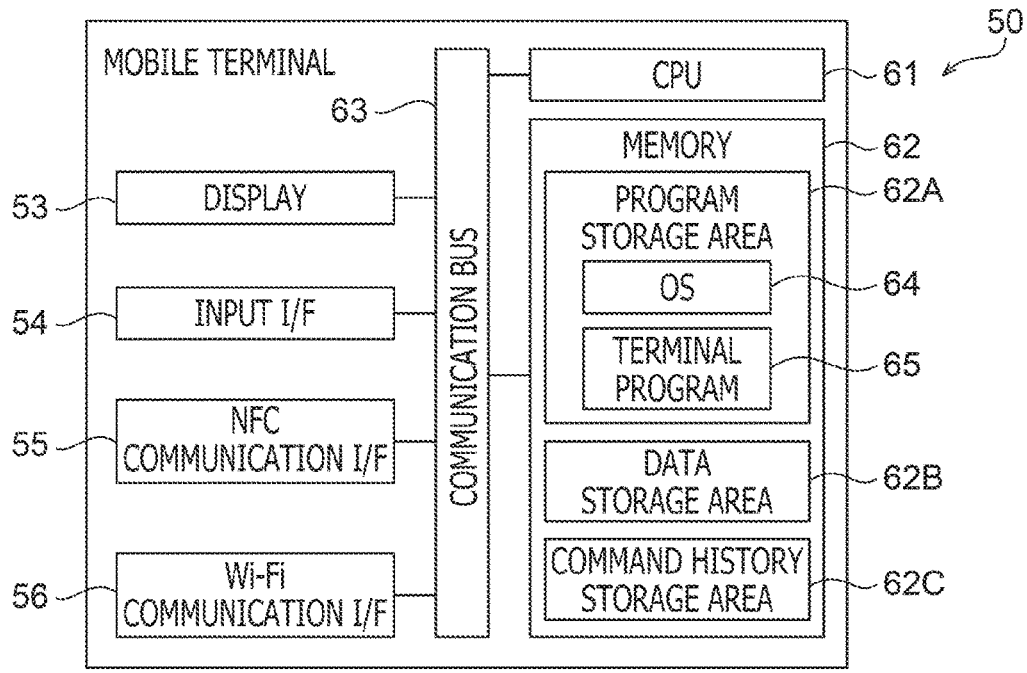
FIG. 2A is a block diagram to illustrate a configuration of a mobile terminal according to the embodiment of the present disclosure.

The mobile terminal 50 may include, for example, a mobile phone, a smartphone, and a tablet terminal. As shown in FIG. 2A, the mobile terminal 50 includes a display 53, an input I/F (I/F) 54, an NFC communication I/F 55, a Wi-Fi communication (I/F) 56, a CPU 61, a memory 62, and a communication bus 63. The components in the mobile terminal 50 are connected with one another through the communication bus 63.

The input I/F 54 is a user interface, through which an inputting operation by a user may be accepted, and may include, for example, buttons. Signals corresponding to one of the buttons pressed by the user may be output to the CPU 61. The input I/F 54 may include a piece of touch sensor layered over an outer surface of the display 53. In the following description, the input I/F 54 having the layer of touch sensor laid over the display 53 may be called as a touch panel 53. The user may touch the touch panel 53 to select an object displayed on a display surface of the touch panel 53 and input text or numeric figures through the touch panel 53. The object displayed on the display surface of the touch panel 53 may include, for example, text, an icon, a button, and a link.

The NFC communication I/F 55 enables wireless communication with an external device to exchange wireless signals in a near field wireless communication technology. The NFC communication I/F 55 has an IC chip, including a memory to store information to be exchanged with the external device, mounted thereon and may communicate wirelessly with the external device in a wireless communication protocol in compliance with an NFC standard. In the following description, wireless communication through the NFC communication I/F 55 may be called as NFC communication, and wireless communication through the Wi-Fi communication I/F 56 may be called as Wi-Fi communication. A communication range for the NFC communication may be smaller than a communication range for the Wi-Fi communication. Through the NFC communication I/F 55, the mobile terminal 50 may transmit information to the MFP 10 and receive information from the MFP 10.

The Wi-Fi communication I/F 56 enables wireless communication with an external device. A protocol for the wireless communication through the Wi-Fi communication I/F 56 may not necessarily be limited. The Wi-Fi communication with the external device may be indirect wireless communication through the communication network 101 or may be direct wireless communication without being relayed by an intermediate relaying device. A communication distance for the Wi-Fi communication may be longer than a communication distance for the NFC communication. Through the Wi-Fi communication I/F 56, the mobile terminal 50 may output information to the MFP 10 and the server 80 and may receive information from the MFP 10 and the server 80.

The CPU 61 may control overall actions in the mobile terminal 50. The CPU 61 may call programs, which will be described later, stored in the memory 62 and execute the programs according to information output from the input I/F 54 or information received from the external device(s) through the NFC communication I/F 55 or the Wi-Fi communication I/F 56.

The memory 62 has a program storage area 62A, a data storage area 62B, and a command history storage area 62C. The program storage area 62A may store an operating system (OS) 64 and a terminal program 65. The terminal program 65 is an application program to cause the CPU 61 to conduct processes shown in FIGS. 6A through 7B, which will be described later in detail. The command history storage area 62C will be described later in detail.

The memory 62, and a memory 32 in the MFP 10 described later as well, may include, for example, a RAM, a ROM, an EEPROM, an HDD, a portable recording medium such as a USB memory attachable to the mobile terminal 50, a buffer memory in the CPU 62, and a combination of any of these. The memory 62 may be a computer-readable storage medium, which is a non-transitory medium. The non-transitory medium may include a recording medium such as, for example, a CD-ROM and a DVD-ROM. The non-transitory medium may be a tangible medium. Meanwhile, electrical signals conveying a program that is downloadable through the communication network 101, for example, from a server, may form a computer-readable signal medium but may not form a non-transitory computer-readable storage medium.

<Detailed Configuration of the MFP>

Figure 2B:
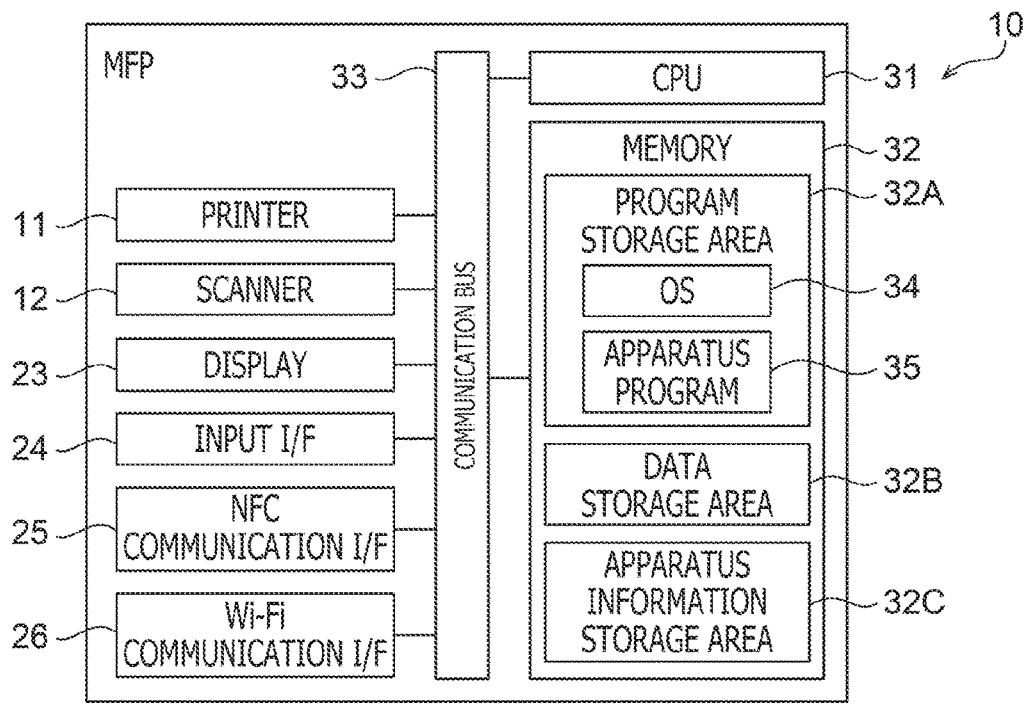
FIG. 2B is a block diagram to illustrate a configuration of a multifunction peripheral (MFP) according to the embodiment of the present disclosure.

The MFP 10 includes, as shown in FIG. 2B, a printer 11, a scanner 12, a display 23, an input I/F 24, an NFC communication I/F 25, a Wi-Fi communication I/F 26, a CPU 31, the memory 32, and a communication bus 33. Optionally, the MFP 10 may have a facsimile device to enable facsimile communication with an external device. The components in the MFP 10 are connected with one another through the communication bus 33. The MFP 10A and the MFP 10B may or may not necessarily be in the same configuration.

The printer 11 may perform a printing action to record an image expressed in image data on a sheet. The printer 11 may record the image in a known printing technic, which includes, for example, an inkjet printing technic and an electro-photographic printing technic. The scanner 12 may perform a scanning action to read an image on a source sheet and generate image data expressing the read image. The MFP 10 may not necessarily be equipped with both the printer 11 and the scanner 12 but may be equipped with solely one of the printer 11 and the scanner 12.

The input I/F 24 is a user interface, through which an inputting operation by a user may be accepted. The input I/F 24 may include an operation panel. The input I/F 24 may output an operating signal associated with the inputting operation by the user to the CPU 31.

The NFC communication I/F 25 enables, similarly to the NFC communication I/F 55 in the mobile terminal 50, wireless communication with an external device to exchange wireless signals in the near field wireless communication technology. The NFC communication I/F 25 has an IC chip, including a memory to store information to be exchanged with the external device, mounted thereon and may communicate wirelessly with the external device in the wireless communication protocol in compliance with the NFC standard.

The Wi-Fi communication I/F 26 enables, similarly to the Wi-Fi communication I/F 56 in the mobile terminal 50, wireless communication with an external device. A protocol for the wireless communication through the Wi-Fi communication I/F 56 may not necessarily be limited. The Wi-Fi communication with the external device may be indirect wireless communication through the communication network 101 or may be direct wireless communication without being relayed by an intermediate relaying device.

In the present embodiment, the Wi-Fi communication I/F 56 in the mobile terminal 50 may perform a polling action (see S48 in FIG. 6A and S208 in FIG. 6B, which will be described later in detail). The polling action includes outputting polling signals repeatedly at a predetermine time interval and monitoring response signals being output in response to the polling signals for a predetermined length of time. Meanwhile, the Wi-Fi communication I/F 26 in the MFP 10 may perform a listening action, which includes monitoring the polling signals form the Wi-Fi communication I/F 56 and outputting the response signals in response to receipt of the polling signals. In other words, the polling signals output from the Wi-Fi communication I/F 56 of the mobile terminal 50 may be received by the Wi-Fi communication I/F 26 of the MFP 10, and the response signals output from the Wi-Fi communication I/F 26 of the MFP 10 may be received by the Wi-Fi communication I/F 25 of the mobile terminal 50. In these actions, a communication link in compliance with the Wi-Fi communication protocol may be established between the MFP 10 and the mobile terminal 50 so that the MFP 10 and the mobile terminal 50 may thereafter exchange information through the Wi-Fi link.

The CPU 31 may control overall actions in the MFP 10. The CPU 31 may call programs stored in the memory 32 and execute the programs according to information output from the input I/F 24 or information received from the external device(s) through the NFC communication I/F 25 or the Wi-Fi communication I/F 26.

The memory 32 has a program storage area 32A, a data storage area 32B, and an apparatus information storage area 32C. The program storage area 32A may store an OS 34 and an apparatus program 35. The data storage area 32B may store data and information necessary to execute the apparatus program 35. The apparatus information storage area 32C may store apparatus information concerning the MFP 10. The apparatus information may include, for example, identifying information of the MFP 10 (apparatus ID), information concerning action status (e.g., user information, operation history, etc.), and refill forecast information concerning consumable items to be used in the MFP 10.

<Server>

The server 80 as shown in FIG. 1 may be a storage server. For example, the server 80 may store data received from the mobile terminal 50 or the MFP 10 in a memory (not shown), read data designated by the mobile terminal 50 or the MFP 10 from the server, and transmit the data to the mobile terminal 50 or to the MFP 10.

<Need for Obtaining Apparatus Information by the Server>

As mentioned above, the MFP 10 stores the apparatus information including the operation history in the apparatus information storage area 32C. Meanwhile, in order to aid the user in a situation where the user may not handle, such as monitoring operating conditions of the MFP 10, forecasting timing to refill consumable items, etc., the server 80 may obtain the apparatus information from the MFP 10.

In this regard, the input I/F 24 serving as the user interface, which may often be an operation panel, may be inconvenient in some aspects: contents being displayed may be visually difficult to recognize, or buttons or keys may be too small for some users. While the input I/F 24 may be difficult to handle, the user may find it even more difficult to operate the input I/F 24 to transmit the apparatus information from the MFP 10 to the server 80.

In consideration of the potential difficulty, in the present embodiment, a user is allowed to select a setting, whether the apparatus information may be transmitted from the MFP 10 to the server 80, through the mobile terminal 50. In the following paragraphs, described will be details of the procedures.

<Command from the Mobile Terminal to Transmit the Apparatus Information>

FIG. 3A illustrates a screen 71 called to be displayed initially in the display 53 by a predetermined operation to the mobile terminal 50. In the following paragraphs, the display 53 illustrated in FIGS. 3A through 5 and FIGS. 8 through 10 will be described as a touch panel 53.

As shown in FIG. 3A, the screen 71 contains a devise selecting field 71A to prompt the user to select one of operable devices, which may be operated by the user through the mobile terminal 50. The device selecting field 71A may contain a message Ma to the user such as "Select a device."

The screen 71 further contains buttons 17B-71F in an upper area with respect to the device selecting field 71A. The buttons 17B-17F are associated with the operable devices and may include a print button 71B, a scan button 71C, a copy button 71D, a FAX button 71E, and a status button 71F. The print button 71B is a button to cause the device to perform a printing action. The scan button 71C is a button to cause the device to perform a scanning action. The copy button 71D is a button to cause the device to perform a copying action. The FAX button 71E is a button to cause the device to perform a facsimile-transmitting or facsimile-receiving action. The status button 71F is a button to cause the display 53 to show an operation status of the device in the touch panel 53.

The screen 71 further includes an "i" button 17G at an upper rightward position in the touch panel 53. Function of the "i" button 17G will be described later.

If the user, for example, taps on the device selecting field 71A, the screen 71 in the touch panel 53 may shift to a screen 72 shown in FIG. 3B.

As shown in FIG. 3B, in the screen 72, displayed may be device display fields 72A-72C. The device display fields 72A-72C indicate the operable devices that may be operated by the mobile terminal 50, in other words, devices that are connectable to communicate with the mobile terminal 50. Each device display field 72A, 72B, 72C contains identifying information, e.g., a model number, a device ID, etc., corresponding to one of the MFPs 10.

For example, as shown in FIG. 3B, the device display field 72A may contain "MFP-1" being identifying information of the MFP 10A and "192.10.0.1.52" being an IP address of the MFP 10A. The device display 72B may contain "MFP-2" being identifying information of the MFP 10B and "192.10.0.1.52" being an IP address of the MFP 10B. The device display field 72C may contain "PRINTER-1" being identifying information of a printer (not shown), which is different from the MFPs 10A, 10B, and "192.10.0.1.61" being an IP address of the printer.

If the user, for example, taps on the device display field 72A, selection of the MFP 10A may be entered (see a checkmark in the device display field 72A in FIG. 3B). The user may thereafter tap on a return button 72D at a lower position in the touch panel 53, and the screen 72 in the touch panel 53 may shift to a screen 71' (see FIG. 4A), which appears similarly to the screen 71 in FIG. 3B.

Figure 4A:
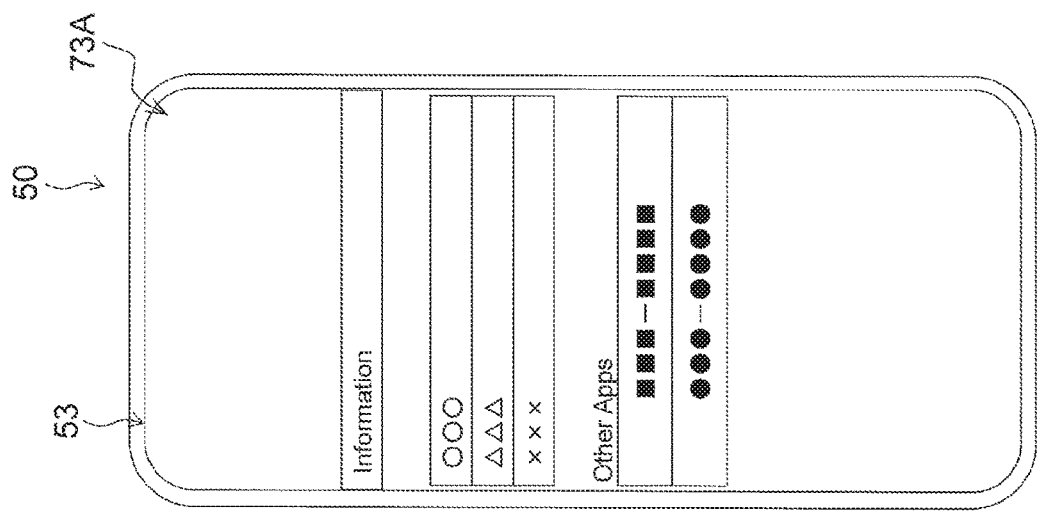
FIGS. 4A-4B illustrate screens to be displayed in the mobile terminal according to the embodiment of the present disclosure.

As shown in FIG. 4A, the screen 71' contains the device selecting field 71A, including a selected device indication Mb, which indicates "MFP-1" identifying the device (e.g., MFP 10A) selected in the previous screen 72. A reminder of the screen 71' other than the selected device indication Mb is the same as the screen 71.

Figure 4B:
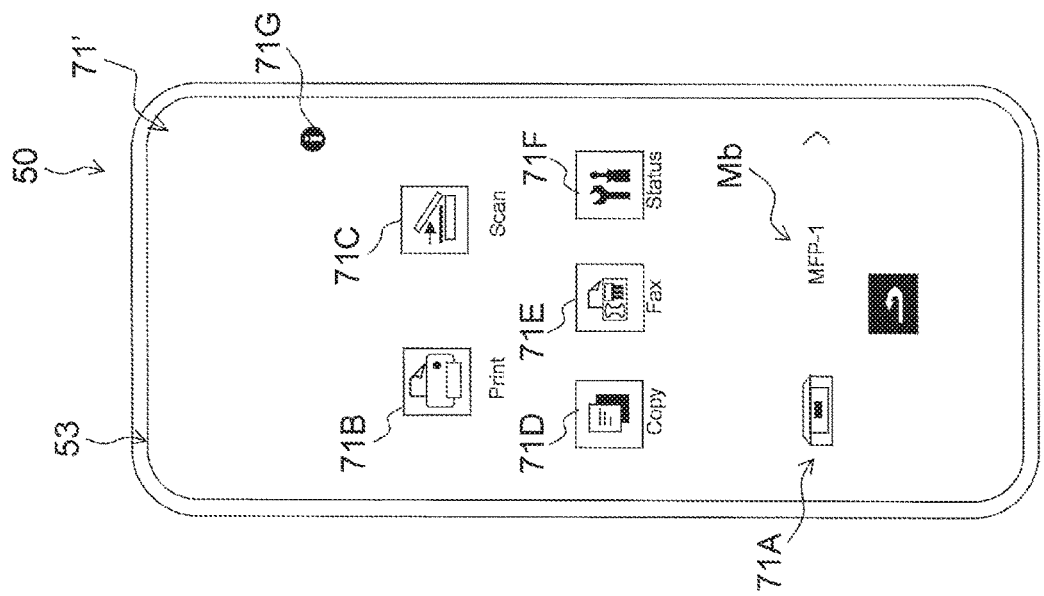

The user may thereafter tap on the "i" button 71G in the screen 71', and the screen 71' in the touch panel 53 may shift to a screen 73A shown in FIG. 4B. If the user scrolls the screen 73A, for example, upward to a predetermined amount, a screen 73B as shown in FIG. 5 may be displayed.

Figure 5:
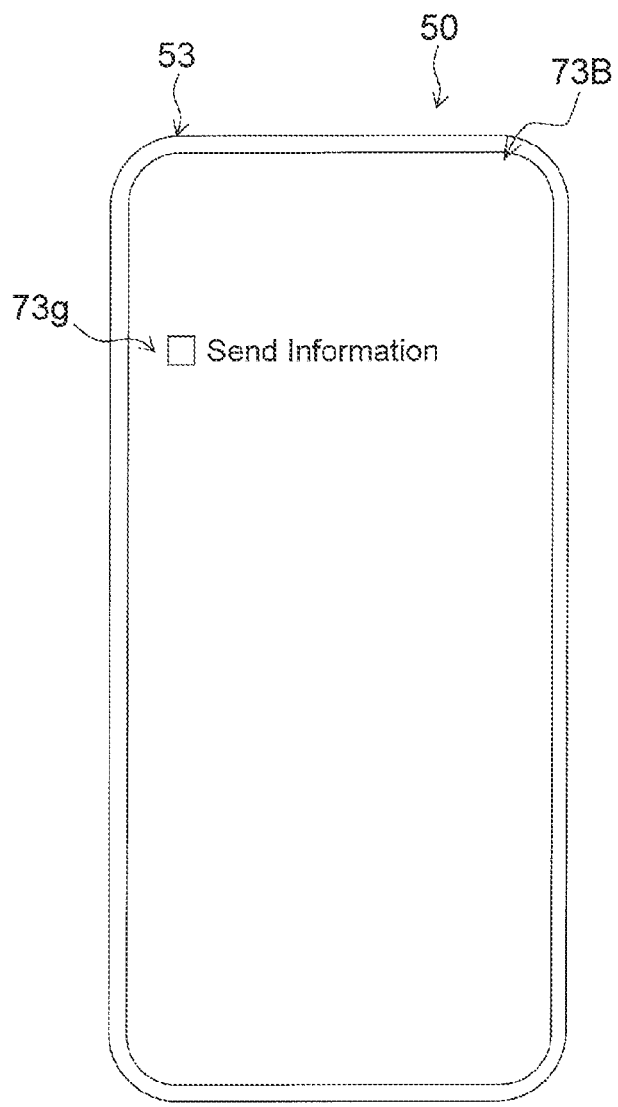
FIG. 5 illustrates a screen to be displayed in the mobile terminal according to the embodiment of the present disclosure.

As shown in FIG. 5, the screen 73B contains a setting checkbox 73g, through which the user may allow or restrict transmission of the apparatus information to the server 80. The setting checkbox 73g may be accompanied by signage "Send Information" so that the user may recognize that a checkmark should be placed if the user prefers the device, e.g., the MFP 10, to transmit the apparatus information to the server 80.

That is, if a checkmark is placed in the setting checkbox 73g by the user, a command to shift the device, e.g., the MFP 10, selected in the preceding procedure to a transmittable condition may be transmitted to the device. In the transmittable condition, the device may transmit the apparatus information to the server 80 automatically at a predetermined timing. Meanwhile, if no checkmark is placed in the setting box 73g (see FIG. 5), a command to shift the device, e.g., the MFP 10, to a suspended condition may be transmitted to the device, e.g., the MFP 10A. The device in the suspended condition may not transmit the apparatus information to the server 80. Behaviors of the device in the transmittable condition and the suspended condition will be described later in detail.

Thus, the user may operate the screens in the touch panel 53 of the mobile terminal 50 to set the selected device, e.g., the MFP 10A, to enable or disable the transmission of the apparatus information from the device to the server 80. In the following paragraphs, with reference to FIGS. 6A through 7B, described will be flows of processes to be conducted by the CPU 61 of the mobile terminal 50 to enable or disable the transmission setting.

<Controlling Flow in Mobile Terminal>

The flow shown in FIGS. 6A-7B may be executed, when the user activates one of the application programs installed in the mobile terminal 50, by the CPU 61 reading the application program from the program storage area 62A.

Figure 6A:
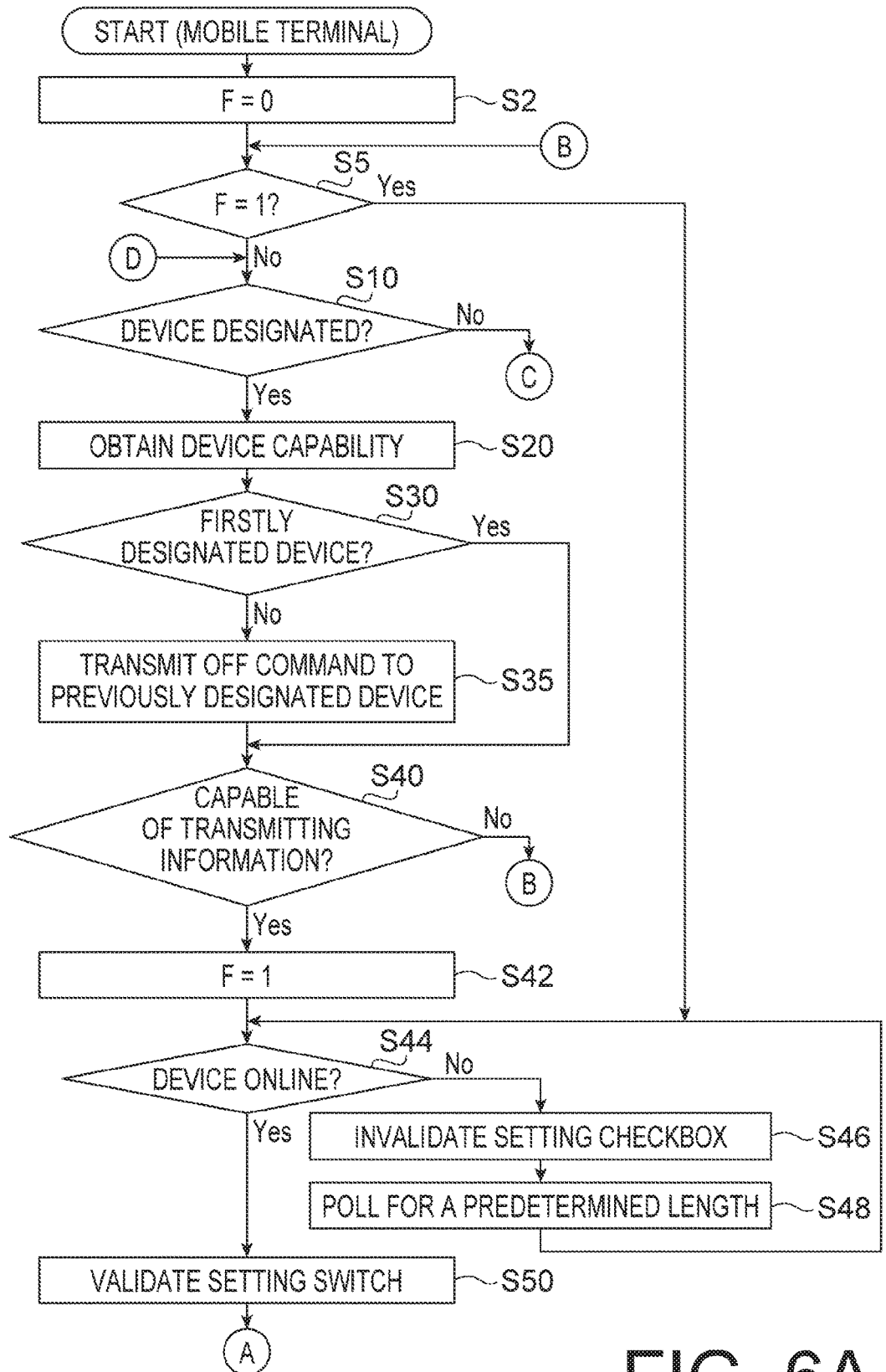
FIGS. 6A-6B are flowcharts to illustrate flows of processes to be conducted by a CPU in the mobile terminal according to the embodiment of the present disclosure.

In S2, as shown in FIG. 6A, the CPU 61 in the mobile terminal 50 initializes a flag F, which indicates designation status of an operable device, to zero (0). In other words, while no operable device is designated, the flag F indicates 0 (F=0). The flow proceeds to S5.

In S5, the CPU 61 determines whether the flag F is one (1). The flag F may be set to 1 in S42, which will be described later. If the flag F indicates 1 (S5: YES), the flow proceeds to S44. If the flag F indicates 0 (S5: NO), the flow proceeds to S10.

In S10, the CPU 61 determines whether one of the devices that are selectable from the mobile terminal 50 is designated to be an operable device by the user through the screens 71-72 (see FIGS. 3A-3B). The selectable devices may be, for example, devices, of which identifying information, e.g., device names, device IDs, etc., is registered in advance, or devices, of which identifying information is registered by the CPU 16 in a known method when a driver software program for the device is installed. The selectable devices may not necessarily be currently online. For another example, the mobile terminal 50 may broadcast a signal and display a device detected by the broadcasted signal as a selectable device. Meanwhile, if the mobile terminal 50 finds solely one device that is connected to communicate with the mobile terminal 50 as a selectable device, the user may not necessarily select the device but the detected device may be automatically designated by the CPU 61 to be the operable device. The expression that the device is online may mean that the device is connected to a network, e.g., the wireless LAN 102, so that the device may communicate with the mobile terminal 50. On the other hand, expression that the device is offline may mean that the device is disconnected from the network, e.g., the wireless LAN, and the device may not communicate with the mobile terminal 50.

In any case, a device may be designated to be the operable device being a transmitter to transmit the apparatus information to the server 80. If no device is designated (S10: NO), the flow proceeds to S204. If a device is designated (S10: YES), the flow proceeds to S20.

In S20, the CPU 61 obtains capability information, which indicates whether the device, e.g., the MFP 10A, designated in S10 is capable of transmitting the apparatus information to the server 80, through, for example, a known MIB (Management Information Base). The flow proceeds to S30.

In S30, the CPU 61 determines whether the device designated in S10 is a first device designated for a first time in the currently running application program. If the device is the first device designated for the first time in the currently running application program (S30: YES), the flow proceeds to S40. If the device is not designated for the first time, in other words, if any other device was designated in the currently running application program in the past (S30: NO), the flow proceeds to S35.

In S35, the CPU 61 transmits a command to the device that was designated immediately before the currently designated device. The command from the CPU 61 may shift the device to the suspended condition, in which the device is not allowed to transmit the apparatus information to the server 80. In the following paragraphs, the suspended condition may be called as an OFF condition, and the command from the CPU 61 to shift the device to the OFF condition may be called as an OFF command. Meanwhile, the transmittable condition, in which the device is allowed to transmit the apparatus information to the server 80, may be called as an ON condition, and a command from the CPU 61 to shift the device to the ON condition may be called as an ON command. If the former device designated immediately before the currently designated device is currently offline, the CPU 61 may attempt to restore the former designated device online in a known method, and when the former designated device returns online, the CPU 61 may transmit the OFF command to the former designated device. The flow proceeds to S40.

In S40, the CPU 61 determines whether the currently designated device, designated in S10, is capable of transmitting the apparatus information to the server 80 based on the capability information obtained in S20. If the currently designated device is not capable of transmitting the apparatus information to the server 80 (S40: NO), the flow returns to S10. If the currently designated device is capable of transmitting the apparatus information to the server 80 (S40: YES), the flow proceeds to S42.

In S42, the CPU 61 sets the flag F to 1. The flow proceeds to S44.

In S44, the CPU 61 determines whether the device currently designated by the mobile terminal 50, e.g., the MFP 10A, is online. If the currently designated device is online (S44: YES), the flow proceeds to S50. If the currently designated device is offline (S44: NO), the flow proceeds to S46.

Figure 8:
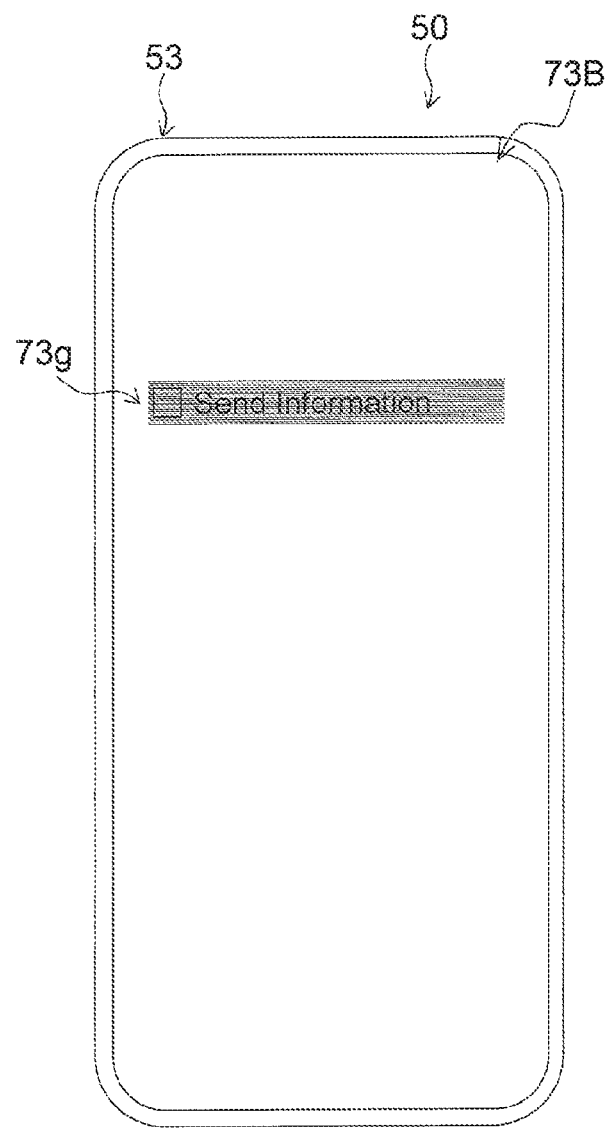
FIG. 8 illustrates a screen to be displayed in the mobile terminal according to the embodiment of the present disclosure.

In S46, the CPU 61 invalidates the setting checkbox 73g (see FIG. 5) in the touch panel 63. The CPU 61 may invalidate the setting checkbox 73g by, for example, not displaying at all or displaying the checkbox 73g in gray-out appearance (see FIG. 8). FIG. 8 illustrates the setting checkbox 73g, along with the signage "Send Information," being displayed in gray and inoperable. In the gray-out appearance, the checkbox 73g may not accept the user's checkmark. Following S46, the flow proceeds to S48.

In S48, the CPU 61 polls the currently designated device on its presence for a predetermined length of time in a known method. Following S48, the flow returns to S44 and repeats S44, S46, and S48. Thus, while the currently designated device stays offline, the CPU 61 refrains from transmitting an ON command in S120 or an OFF command in S180. Behaviors of the CPU 61 in S120 and S180 will be described later in detail. Once the currently designated device returns online while the CPU 61 repeats S44, S46, and S48, the flow proceeds from S44 (S44: YES) to S50.

In S50, the CPU 61 validates the setting checkbox 73g (see FIG. 5) in the touch panel 53. In particular, the CPU 61 displays the setting checkbox 73g as shown in FIG. 5 to be operable.

Meanwhile, in S40, if the currently designated device is capable of transmitting the apparatus information to the server 80 (S40: YES), the flow proceeds through S42 and S44 to S50, where the setting checkbox 73g is displayed. On the other hand, if the currently designated device is not capable of transmitting the apparatus information to the server 80 (S40: NO), the flow avoids S50, and the setting checkbox 73g is not displayed.

In S50, the user may enter preference, whether the apparatus information should be or should not be transmitted from the currently designated device to the server 80, by placing a checkmark in the setting checkbox 73g or leaving the setting checkbox 73g blank. In other words, the user's preferred setting concerning the transmission of the apparatus information may be accepted through the setting checkbox 73g. Following entry of the user's preference in S50, the flow proceeds to S60 (see FIG. 7A).

Figure 7A:
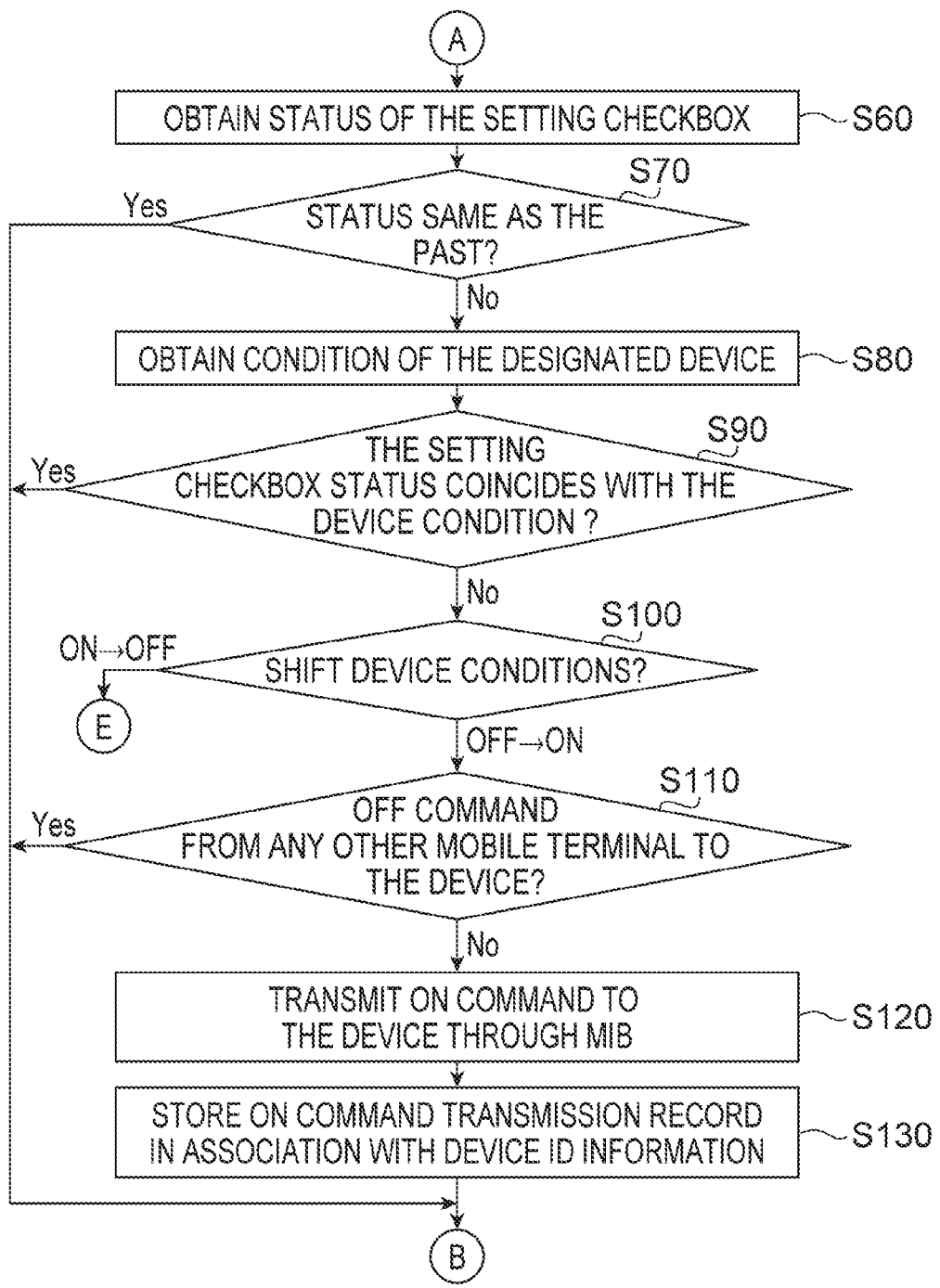
FIGS. 7A-7B are flowcharts to illustrate flows of processes to be conducted by the CPU in the mobile terminal according to the embodiment of the present disclosure.

As shown in FIG. 7A, in S60, the CPU 61 obtains a status of the setting checkbox 73g. In other words, the CPU 61 determines whether a checkmark was placed in S50 and the mobile terminal 50 is in an OFF setting, in which the CPU 61 may command the designated device to shift to the ON condition so that the apparatus information may be transmitted from the device to the server 80, or no checkmark was placed in S50 and the mobile terminal 50 is in an OFF setting, in which the CPU 61 may command the currently designated device to shift to the OFF condition. Following S60, the flow proceeds to S70.

In S70, the CPU 61 determines whether the current device designated in S10 was ever designated by the CPU 61 of the mobile terminal 50 in the past, and the status of the setting checkbox 73g obtained in S60 is the same as a past status of the setting checkbox 73g when the device was designated in the past. If the current device was designated in the past, and if the status of the setting checkbox 73g for the currently designated device is the same as the status of the setting checkbox 73g for the same device in the past (S70: YES), the flow returns to S5 (see FIG. 6A) and repeats the steps onward. In the repeated flow, in S42, the CPU 61 determines that the flag F is 1 (S5=YES). Accordingly, the flow proceeds to S44 without repeating S10 through S42.

Meanwhile, in S70, if the currently designated device has never been designated by the CPU 61, or if the status of the setting checkbox 73g obtained in S60 is different from the past status of the setting checkbox 73g even if the device was designated in the past (S70: NO), the flow proceeds to S80.

In S80, the CPU 61 obtains information concerning the current device designated in S10 indicating whether the device is in the ON condition, in which the apparatus information may be transmitted from the device to the server 80, or in the OFF condition, in which the apparatus information may not be transmitted from the device to the server 80. The flow proceeds to S90.

In S90, the CPU 61 determines whether the status of the setting checkbox 73g obtained in S60, i.e., either the ON setting or the OFF setting, coincides with the condition of the device obtained in S80, i.e., either the ON condition or the OFF condition. If the status of the setting checkbox 73g coincides with the condition of the device, in other words, in either a combination of the ON setting in the setting checkbox 73g and the ON condition in the device, or a combination of the OFF setting in the setting checkbox 73g and the OFF condition in the device (S90: YES), the flow returns to S5 (see FIG. 6A) and repeats the steps onward. Therefore, if the status of the setting checkbox 73g coincides with the condition of the device, the CPU 61 refrains from transmitting an ON command in S120 or an OFF command in S180. Behaviors of the CPU 61 in S120 and S180 will be described later in detail. In the repeated flow, in S42, the CPU 61 determines that the flag F is 1 (S5=YES). Accordingly, the flow proceeds to S44 without repeating S10 through S42.

If the status of the setting checkbox 73g differs from the condition of the device (S90: NO), the flow proceeds to S100.

In S100, the CPU 61 determines a command to be addressed to the designated device based on the inconsistency between the status of the setting checkbox 73g and the condition of the currently designated device between the ON command and the OFF command. In other words, the CPU 61 determines whether the CPU 61 should command the device being in the OFF condition to shift to the ON condition, in which the apparatus information may be transmitted to the server 80, or the CPU 61 should command the device being in the ON condition to shift to the OFF condition, in which the apparatus information may not be transmitted to the server 80.

In S100, if the command to be addressed to the designated device is an ON command to shift the device being in the OFF condition to the ON condition, the flow proceeds to S110. In S110, the CPU 61 determines whether there is any mobile terminal 50 (e.g., the mobile terminal 50B) already commanding the designated device the OFF condition other than the mobile terminal 50 (e.g., the mobile terminal 50A) to which the CPU 61 belong. In this regard, each mobile terminal 50 has the command history storage area 62C in the memory 62 to store records concerning transmission of ON commands and OFF commands therefrom to devices in association with identifying information (e.g., terminal ID, etc.) of the devices. The identifying information of the devices may be, for example, a Mac address. In S110, therefore, the CPU 61 may obtain the history of transmission from the other mobile terminals 50 to determine whether there is any other mobile terminal 50 that is already commanding the same device the OFF condition. If there is another mobile terminal 50 commanding the same device the OFF condition (S110: YES), the flow returns to S5 (see FIG. 6A) and repeats the steps onward. Commanding the device to shift to the ON condition, while another mobile terminal 50 is commanding the same device to shift to or stay in the OFF condition, may cause conflict with the earlier OFF command by the another mobile terminal 50. Therefore, in order to avoid such conflict and yield to the earlier command by the another mobile terminal 50, the CPU 61 refrains from transmitting an ON command in S120. In the repeated flow, the CPU 61 determines that the flag F is 1 (S5=YES). Accordingly, the flow proceeds to S44 without repeating S10 through S42.

On the other hand, in S110, if there is no other mobile terminal 50 already commanding the same device the OFF condition (S110: NO), the flow proceeds to S120. In S120, the CPU 61 transmits an ON command to the designated device through the MIB. The flow proceeds to S130.

In S130, the CPU 61 stores the identifying information (e.g., terminal ID) of the mobile terminal 50, to which the CPU 61 belong, and a transmission record of the ON command in S120 associated with identifying information (e.g., MAC address) of the device, to which the ON command is addressed, in the command history storage area 62C. The flow returns to S5 (see FIG. 6A) and repeats the steps onward. In the repeated flow, the CPU 61 determines that the flag F is 1 (S5=YES). Accordingly, the flow proceeds to S44 without repeating S10 through S42.

Figure 7B:
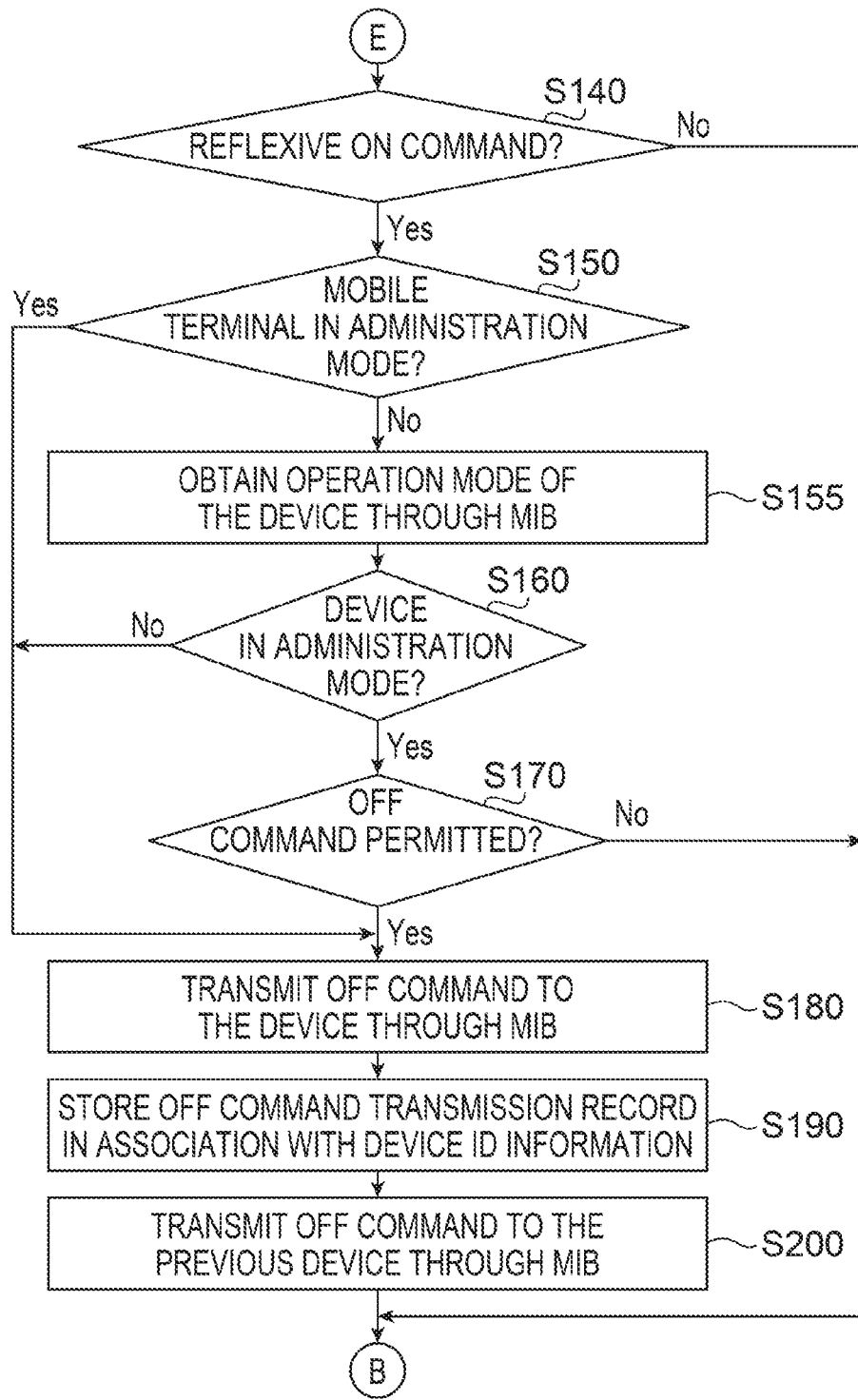

Meanwhile, in S100, if the command to be addressed to the designated device is an OFF command to shift the device from the ON condition to the OFF condition, the flow proceeds to S140 (see FIG. 7B). In S140, while the designated device is in the ON condition, the CPU 61 determines whether the ON condition in the device is caused by an ON command reflexively from the mobile terminal 50, to which the CPU 61 belongs. The determination in S140 may be made by, for example, obtaining the transmission history stored in the command history storage area 62C from each of the other mobile terminals 50, similarly to S110.

If the ON condition in the device is not caused reflexively by an ON command from the mobile terminal 50 to which the CPU 61 belongs (S140: NO), the flow returns to S5 (see FIG. 6A) and repeats the steps onward. Commanding the device to shift to the OFF condition, while another mobile terminal 50 is commanding the same device the ON condition, may cause conflict with the earlier ON command by the another mobile terminal 50. Therefore, in order to avoid such conflict and yield to the earlier command by the another mobile terminal 50, the CPU 61 refrains from transmitting an OFF command in S180. In the repeated flow, the CPU 61 determines that the flag F is 1 (S5=YES). Accordingly, the flow proceeds to S44 without repeating S10 through S42. On the other hand, if the ON condition in the device is caused by an ON command reflexively from the mobile terminal 50 to which the CPU 61 belongs (S140: YES), the flow proceeds to S150.

In S150, the CPU 61 determines whether an operation mode of the mobile terminal 50, or an operation mode of the application program, is an administration mode. The mobile terminal 50 may operate in either the administration mode or a public mode. Similarly, the MFP 10 may operate in either an administration mode or a public mode. When the mobile terminal 50 is operating in the administration mode, the mobile terminal 50 has the initiative over the MFP 10 to transmit the OFF command to the device regardless of the operation mode in the MFP 10 (see S180 below).

On the other hand, when the mobile terminal 50 is operating in the public mode, behaviors of the CPU 61 differ depending on the operation mode in the MFP 10. Namely, when the MFP 10 is operating in the public mode, the mobile terminal 50 has the initiative to transmit the OFF command to the device (see S180 below). Meanwhile, when the MFP 10 is operating in the administration mode, the mobile terminal 50 may only transmit the OFF command to the device when the mobile terminal 50 is permitted by the MFP 10. In other words, the CPU 61 may not transmit the OFF command when the mobile terminal 50 is not permitted by the MFP 10 (see S170 below).

Therefore, in S150, the CPU 61 determines whether the mobile terminal 50 is operating in the administration mode. If the mobile terminal 50 is operating in the administration mode (S150: YES), the flow proceeds to S180. If the mobile terminal 50 is not operating in the administration mode but is operating in the public mode (S150: NO), the flow proceeds to S155.

In S155, the CPU 61 obtains the operation mode, which is either the administration mode or the public mode, of the designated device through the MIB. Thereafter, the flow proceeds to S160.

In S160, the CPU 61 determines based on the result obtained in S155 whether the operating mode of the designated device is the administration mode. If the operation mode is not the administration mode but is the public mode (S160: NO), the flow proceeds to S180. If the operation mode is the administration mode (S160: YES), the flow proceeds to S170.

In S170, the CPU 61 determines whether the device operating in the administration mode permits an OFF command from the mobile terminal 50. For example, the CPU 61 may ask the device whether the device may permit the mobile terminal 50 to issue an OFF command to determine the acceptability of the OFF command in the device. If the device does not allow the OFF command from the mobile terminal 50 (S170: NO), the flow returns to S10 (see FIG. 6A) and repeats the steps onward. If the device permits the OFF command from the mobile terminal 50 (S170: YES), the flow proceeds to S180.

In S180, the CPU 61 transmits an OFF command to the designated device through the MIB. The flow proceeds to S190.

In S190, the CPU 61 stores the identifying information (e.g., terminal ID) of the mobile terminal 50 and a transmission record of the OFF command associated with identifying information (e.g., Mac address) of the device, to which the OFF command is addressed, in the command history storage area 62C. The flow proceeds to S200.

In S200, the CPU 61 transmits OFF commands, in accordance with the transmission of the OFF command to the designated device in S180, to all of the devices that were designated in the past. In S200, similarly to S35 (see FIG. 6A), if the devices that were designated in the past are currently offline, the CPU 61 may transmit the OFF commands to the former designated devices after restoring the devices online in a known method. The flow returns to S5 (see FIG. 6A) and repeats the steps onward. In the repeated flow, the CPU 61 determines that the flag F is 1 (S5=YES). Accordingly, the flow proceeds to S44 without repeating S10 through S42.

Meanwhile, in S10, if no device is newly designated (S10: NO), the flow proceeds to S204 (see FIG. 6B). In S204, similarly to S44, the CPU 61 determines whether the device having been designated since S10 in the previous round by the mobile terminal 50, e.g., the MFP 10A, is currently online. If the designated device is online (S204: YES), the flow proceeds to S210. If the designated device is offline (S204: NO), the flow proceeds to S206.

In S206, similarly to S46, the CPU 61 invalidates the setting checkbox 73g (see FIG. 5) in the touch panel 63. The CPU 61 may invalidate the setting checkbox 73g by, for example, not displaying at all or displaying the checkbox 73g in gray-out appearance (see FIG. 8). Following S206, the flow proceeds to S208.

In S208, similarly to S48, the CPU 61 polls the device on its presence for a predetermined length of time in a known method. Following S48, the flow returns to S204 and repeats S204, S206, and S208. Thus, while the designated device stays offline, the CPU 61 refrains from transmitting the ON command in S120 or the OFF command in S180. Once the device returns online while the CPU 61 repeats S204, S206, and S208, the flow proceeds from S204 (S204: YES) to S210.

In S210, similarly to S50, the CPU 61 displays the setting checkbox 73g in the operable manner for the user to enter preference, whether the apparatus information should be transmitted from the designated device to the server 80, by placing a checkmark in the setting checkbox 73g or leaving the setting checkbox 73g blank. The flow proceeds to S220.

In S220, the CPU 61 determines whether the status of the setting box 73g has been changed since, for example, the status in the past, e.g., S210 in a previous round or in S50. If the status of the setting box 73g remains unchanged (S220: NO), the flow returns to S10 and repeats the steps onward. If the status of the setting box 73g has been changed (S220: YES), the flow proceeds to S230.

In S230, the CPU 61 determines whether the flag F is 1. If the flag F was not set to 1 (F=1) in S42 but remains 0 (F=0) (S230: NO), the flow returns to S10 and repeats the steps onward. If the flag F has been set to 1 (F=1) since S42 (S230: YES), the flow proceeds to S60 (see FIG. 7A) and the steps onward, which were described earlier.

<Controlling Flow in Device>

Figure 9:
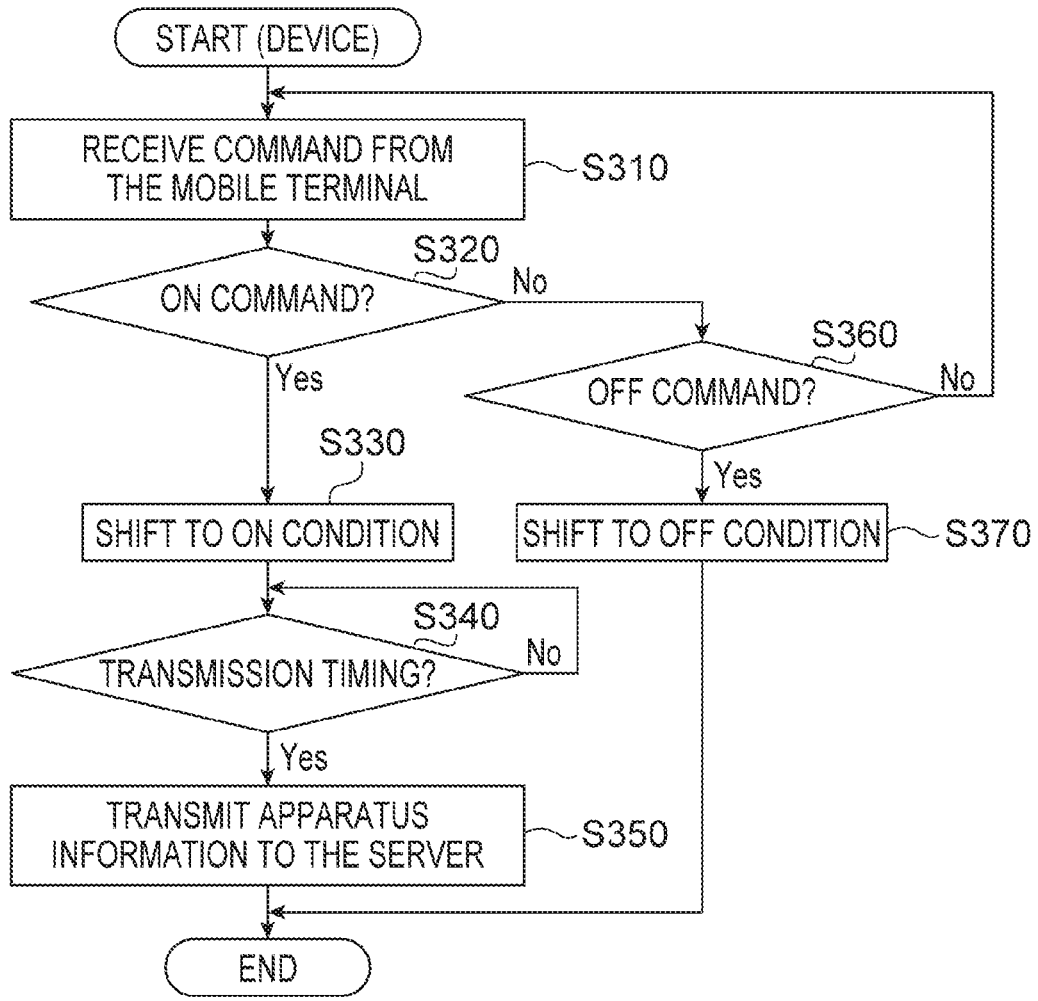
FIG. 9 is a flowchart to illustrate a flow of processes to be conducted by a CPU in the MFP according to the embodiment of the present disclosure.

The device may execute flows shown in FIG. 9 in response to the behaviors of the CPU 61 in the mobile terminal 50 shown in FIGS. 6A-7B. In the following paragraphs, with reference to FIG. 9, described will be flows of steps to be conducted by a controller of the device, e.g., the CPU 31 in the MFP 10, in response to receipt of the ON command or the OFF command from the CPU 61.

The flow shown in FIG. 9 may be executed by the CPU 31 reading the apparatus program 35 from the program storage area 32A.

As the flow starts, in S310, the CPU 31 in the MFP 10 receives a command, which is either the ON command or the OFF command transmitted from the mobile terminal 50 in S120 or S180 (see FIGS. 7A-7B). The flow proceeds to S320.

In S320, the CPU 31 determines whether the command received in S310 is the ON command. If the received command is not the ON command (S320: NO), the flow proceeds to S360. If the received command is the ON command (S320: YES), the flow proceeds to S330.

In S330, the CPU 31 being in the OFF condition, i.e., the suspended condition, in which the apparatus information may not be transmitted to the server 80, shifts to the ON condition, i.e., the transmittable condition, in which the apparatus information may be transmitted to the server 80. The flow proceeds to S340.

In S340, the CPU 31 determines whether timing has reached a point for the CPU 31 to transmit the apparatus information to the server 80. If the timing has not yet reached the point (S340: NO), the CPU 31 repeats S340 in a loop and waits until the timing reaches. When the timing reaches the point for transmission (S340: YES), the flow proceeds to S350.

In S350, the CPU 31 transmits the apparatus information stored in the apparatus information storage area 31C to the server 80. The flow ends thereat.

In S360, on the other hand, following the negative determination in S320 (S320: NO), the CPU 31 determines whether the command received in S310 is the OFF command. If the received command is not the OFF command (S360: NO), the flow returns to S310 and repeats the steps onward. If the received command is the OFF command (S360: YES), the flow proceeds to S370.

In S370, the CPU 31 being in the ON condition, i.e., the transmittable condition, in which the apparatus information may be transmitted to the server 80, shifts to the OFF condition, i.e., the suspended condition, in which the apparatus information may not be transmitted to the server 80. The flow ends thereat.

<Benefits>

According to the embodiment described above, the setting, whether the apparatus information may be transmitted from the MFP 10 to the server 80, may be enabled or disabled by the operations to the mobile terminal 50. In particular, when the MFP 10 to transmit the apparatus information to the server 80 is designated (see S10 in FIG. 6A), a command, i.e., either an ON command or an OFF command, which may shift the designated MFP 10 to the transmittable condition or the suspended condition, may be transmitted to the designated MFP 10 (see S120 and S180 in FIGS. 7A-7B). Therefore, the MFP 10 receiving the command may shift to the ON condition, in which the MFP 10 may transmit the apparatus information to the server 80, or to the OFF condition, in which the MFP 10 may not transmit the apparatus information to the server 80 (see S330 and S370 in FIG. 9). Thus, the user may configure the MFP 10 to transmit or not to transmit the apparatus information to the server 80 by the operations to the mobile terminal 50 with the input I/F 54, which may be more user-friendly than the input I/F 24 of the MFP 10. In this regard, compared to operations to the input I/F 24 of the MFP 10 to shift the MFP 10 in the transmittable condition or the suspended condition, the operations to the input I/F 24 of the mobile terminal 50 may be easier to the user, and usability of the MFP 10 to the user may be improved.

In particular, the ON command to shift the MFP 10 to the ON condition, in which the apparatus information may be transmitted to the server 80, is transmitted from the mobile terminal 50 to the MFP 10. Therefore, compared to operations to the input I/F of the MFP 10, the operations to the input I/F 24 of the mobile terminal 50 may be easier to the user, and usability of the MFP 10 to the user may be improved.

Further, the mobile terminal 50 may transmit the ON command to the MFP 10 when the mobile terminal 50 recognizes that the MFP 10 is capable of transmitting the apparatus information to the server 80 based on the capability information obtained from the MFP 10 (see S40 in FIG. 6A). Thus, the CPU 61 may recognize whether the MFP 10 to be designated is capable of transmitting the apparatus information before the user may designate the MFP 10.

In particular, when the MFP 10 is determined to be capable of transmitting the apparatus information to the server 80 based on the capability information obtained from the MFP 10 (see S40 in FIG. 6A), the setting checkbox 73g may be displayed in the touch panel 53 (see S50 in FIG. 6A), and when the user operates the setting checkbox 73g to select the ON setting, the ON command may be transmitted to the MFP 10 (S60 and S120 in FIG. 7A).

Thus, the user may be visually recognize that the MFP 10 to be designated is capable of transmitting the apparatus information. Meanwhile, when the MFP 10 is incapable of transmitting the apparatus information, the user may be prevented from attempting in vain to select the ON setting in the mobile terminal 50.

Further, the mobile terminal 50 may transmit the OFF command to shift the MFP 10 to the OFF condition to the MFP 10 (see S180 in FIG. 7B). Thus, when the MFP 10 is in the ON condition, in which the MFP 10 may transmit the apparatus information to the server 80, if the user prefers not to transmit the apparatus information from the MFP 10 to the server 80, the OFF command to shift the MFP 10 from the ON condition to the OFF condition may be transmitted to the MFP 10.

The MFP 10 according to the embodiment described above 10 may operate in either the public mode or the administration mode. When the MFP 10 in the public mode receives the OFF command from the mobile terminal 50, the MFP 10 may shift to the OFF condition (see S160 and S180 in FIGS. 7A-7B, S370 in FIG. 9). On the other hand, when the MFP 10 is in the administration mode, the mobile terminal 50 may not transmit the OFF command to the MFP 10 unless the MFP 10 permits the transmission of the OFF command. If the MFP 10 in the administration mode receives the OFF command from the mobile terminal 50, the MFP 10 may ignore the OFF command so that the ON condition in the MFP 10 may be maintained.

According to the embodiment described above, further, when the OFF command is transmitted to the designated MFP 10, the OFF command may be transmitted to the devices designated by the mobile terminal 50 in the past as well (see S200 in FIG. 7B). Thus, with respect to the user's preference that the transmission of the apparatus information from the MFPs 10 to the server 80 should be disabled, the devices that were used by the user in the past are collectively shifted from the ON condition to the OFF condition.

Figure 6B:
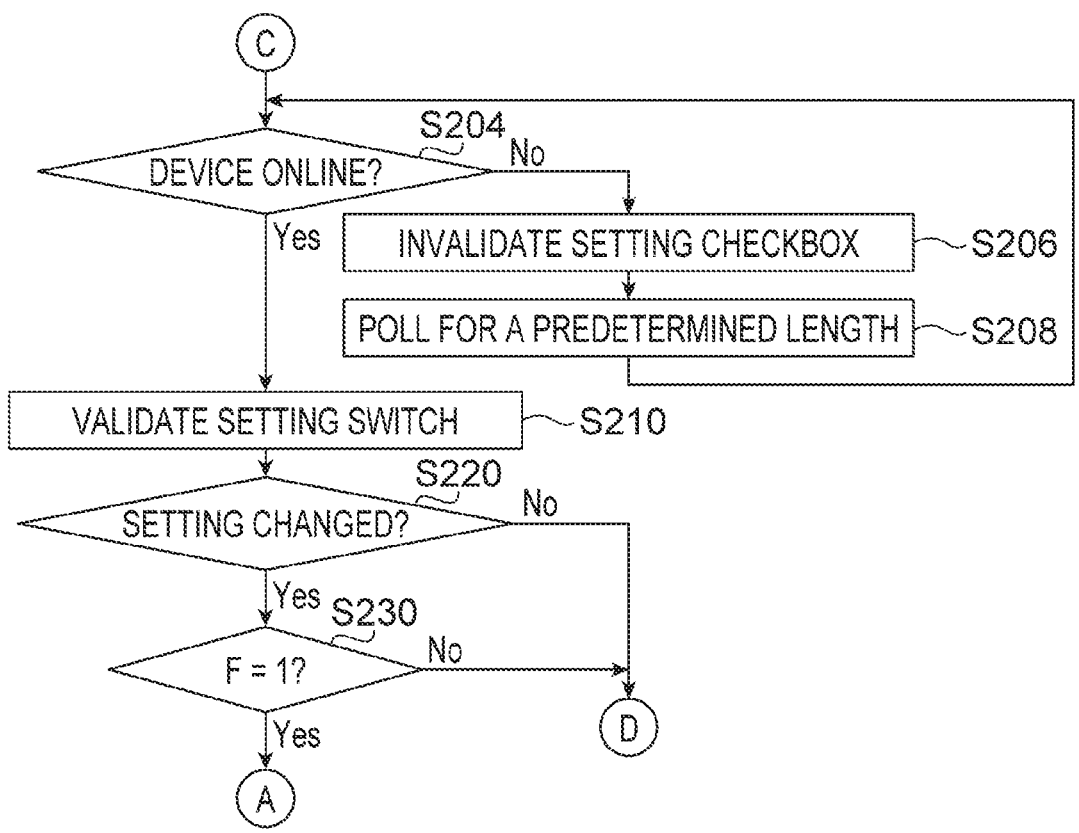

Further, if the designated MFP 10 is determined to be offline, the ON command may be transmitted to the MFP 10 when the MFP 10 is determined to have returned online (see S44 in FIG. 6A, S204 in FIG. 6B, and S120 in FIG. 7A). Thus, if the MFP 10 is in a condition incapable of communicating with the server 80, the ON setting in the mobile terminal 50 entered by the user may be accepted so that the ON command may be transmitted to the MFP 10 later when the MFP 10 returns online to be capable of communicating with the server 80.

On the other hand, the OFF command may be transmitted to the MFP 10 when the MFP 10 once determined to be offline returns online (see S44 in FIG. 6A, S204 in FIG. 6B, and S180 in FIG. 7B). Thus, if the MFP 10 is in the condition incapable of communicating with the server 80, the OFF setting in the mobile terminal 50 entered by the user may be accepted so that the OFF command may be transmitted to the MFP 10 later when the MFP 10 returns online to be capable of communicating with the server 80. In particular, when the user intends to shift the MFP 10 from the ON condition to the OFF condition, it may be preferable that the MFP 10 may be shifted to the OFF condition promptly. For example, it may be assumed that the user is urged by a certain reason to abort storing the apparatus information in the server 80. In other words, abortion of collecting the apparatus information from the MFP 10 may be urgent. In this regard, the OFF command may be transmitted shortly after the determination that the MFP 10 returns online so that the transmission of the apparatus information to the server 80 may be promptly terminated.

Further, according to the present embodiment, when an MFP 10 different from MFPs 10 designated in the past is newly designated, an OFF command is transmitted to all of the MFPs 10 designated in the past (see S35 in FIG. 6A). Thus, as the MFP 10 is newly designated, it may be regarded that the MFPs 10 to be operated by the user are switched, and the MFPs 10 operated by the user in the past may be shifted from the ON condition to the OFF condition.

Meanwhile, when the user designates the same MFP 10 as the MFP 10 designated in the past, and when the preference to the setting checkbox 73g is the same as the past MFP 10, no ON command or OFF command is transmitted to the other MFPs 10 designated in the past (see S70 in FIG. 7A). Therefore, for example, when the user designates a new MFP 10 different from a formerly designated MFP 10 and later designates the former MFP 10 once again, and if the user's preference to the setting for the transmission of the apparatus information to the former MFP 10 remains the same, redundant transmission of an ON command or an OFF command to the same MFP 10 may be avoided.

Further, when the designated MFP 10 is already in the ON condition, no ON command may be transmitted, and when the designated MFP 10 is already in the OFF condition, no OFF command may be transmitted (see S90 in FIG. 7A). Thus, when the current condition concerning the transmission of the apparatus information, i.e., either the ON condition or the OFF condition in the MFP 10, meets the user's preference, redundant transmission of an ON command or an OFF command to the same MFP 10 may be avoided.

Meanwhile, when the condition of the designated MFP 10 being either the ON condition or the OFF condition does not coincide with the command transmission history stored in the command history storage area 62C in the mobile terminal 50, it may be regarded that another mobile terminal 50 commanded the same MFP 10 the ON condition or the OFF condition, and the mobile terminal 50 may not transmit an ON command or an OFF command to the MFP 10 (see S110: YES in FIG. 7A and S140: NO in FIG. 7B). Therefore, the current condition in the MFP 10, i.e., the ON condition or the OFF condition set by another user, may be prevented from being shifted to the other mode, i.e., the OFF condition or the ON condition, forcibly by a different user.

According to the embodiment described above, the apparatus information includes the operation history information. Therefore, the server 80 may obtain the operation history information from the MFP 10 so that processes corresponding to the operations in the MFP 10 may be monitored through the server 80, and timing to refill consumable items, e.g., ink, toner, sheets, may be forecasted through the server 80.

MORE EXAMPLES

Although an example of carrying out the invention have been described, those skilled in the art will appreciate that there are numerous variations and permutations of the computer readable storage medium, the information processing apparatus, and the system that fall within the spirit and scope of the disclosure as set forth in the appended claims.

For example, transmission of the apparatus information from the MFP 10 to the server 80 may be conducted on condition that the user agrees with the transmission through the mobile terminal 50. In the following paragraphs, with reference to FIG. 10, described will be an example of such a configuration modified from the previous embodiment.

Figure 10:
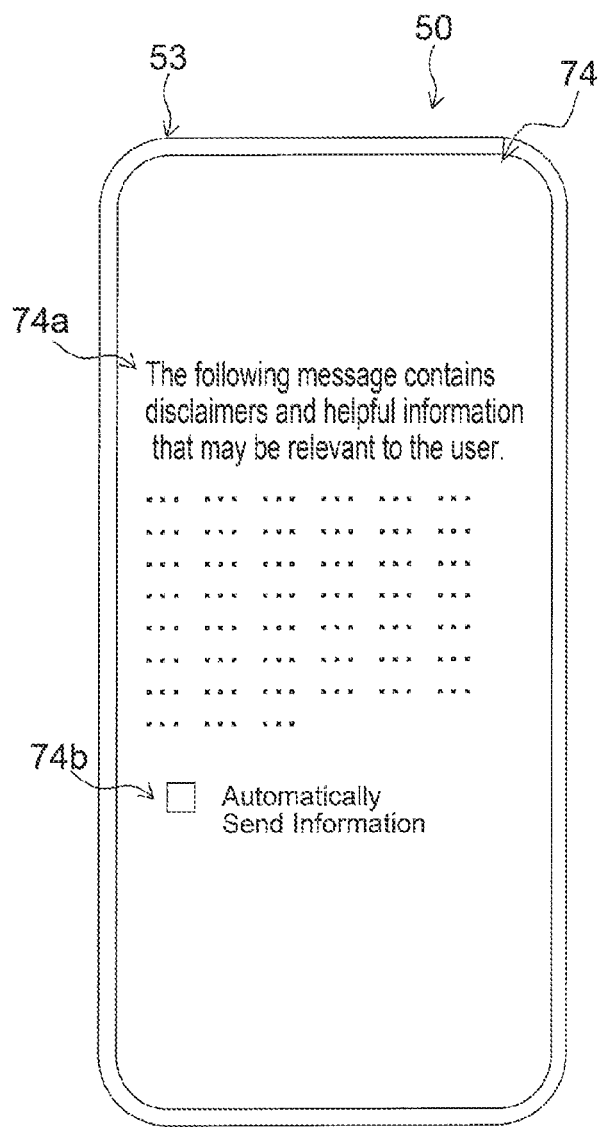
FIG. 10 illustrates a screen to be displayed in the mobile terminal according to a modified example of the embodiment of the present disclosure.

FIG. 10 illustrates a screen 74, which may be initially displayed in the touch panel 53 when the application program is activated in the mobile terminal 50 for the first time after installation. In the screen 74, for example, a text display field 74a containing a statement of disclaimer by a manufacturer may be displayed. In the screen 47, further, in an area below the text display field 74a, a permission checkbox 74b, which may be checked by a user to permit the transmission of the apparatus information from the MFP 10 to the server 80, may be displayed. In an area adjacent to the permission checkbox 74b, signage "Automatically Send Information" may be displayed so that the user may recognize that a checkmark in the permission checkbox 47b allows automatic transmission of the apparatus information from the MFP 10 to the server 80.

The permission checkbox 74b may serve equally to the "i" button 71G displayed in the screen 71' shown in FIG. 4A. Therefore, by placing a checkmark in the permission checkbox 74b, and following a predetermined operation to the touch panel 53, the screen 71 in the touch panel 53 may shift to the screen 73A (see FIG. 4B). Further, if the user scrolls the screen 73A upward to the predetermined amount, the screen 73B as shown in FIG. 5 containing the setting checkbox 73g may be displayed. The user may place a checkmark in the setting checkbox 73g to agree with transmission of the ON command to the device, e.g., the MFP 10A. On the other hand, when the user disagree with the transmission of the apparatus information to the device, e.g., the MFP 10A, the user may leave the setting checkbox 73g blank to so that the OFF command may be sent to the device, e.g., the MFP 10A.

The remainder of the behaviors in the mobile terminal 50 and the MFP 10 may be conducted similarly to those in the previous embodiment; therefore, description of those is herein omitted. Thus, the benefits achievable by the previous embodiment may be similarly achieved by the modified example described above.

For another example, the device to be designated as the transmitter to transmit the apparatus information to the sever 80 may not necessarily be limited to the MFP 10. For example, a scanner device having a single scanning function, which may serve similarly to the scanner 12, a facsimile machine having a single facsimile communication function, a printer having a single printing function, which may serve similarly to the printer 11, may be designated as the transmitter device. Further, the printer being the device to be designated may include a printer capable of printing images and text on sheets of paper in multiple sizes such as, for example, A4, A3, B4, and B5 sizes, and a label printer capable of printing images and text on a printable tape, as long as the printer is connected to the server when in use. Furthermore, the device to be designated may not necessarily be limited to a scanner, a facsimile machine, or a printer but may include an electronic device as long as the electronic device is connected to the server when in use. The benefits achievable by the previous embodiment may be similarly achieved by the electronic device.

For another example, the steps in the flowcharts illustrated in FIGS. 6A-6B, 7A-7B, and 9 may not necessarily be conducted in the order described above but may be conducted in different order, or some steps may be added or omitted, as long as the modified flows of steps stay within the spirit and scope of the disclosure as set forth in the appended claims.

It is to be understood that the subject matter defined in the appended claims is not necessarily limited to the specific features or act described above. Rather, the specific features and acts described above are disclosed as example forms of implementing the claims. In the meantime, the terms used to represent the components in the above embodiment may not necessarily agree identically with the terms recited in the appended claims, but the terms used in the above embodiment may merely be regarded as examples of the claimed subject matters.

What is claimed is:

1. A non-transitory computer readable storage medium storing a computer readable program including computer readable instructions that are executable by a computer in an operating terminal, the operating terminal comprising an operation interface, a display, and a communication interface configured to communicate with an information processing apparatus, the information processing apparatus being capable of transmitting apparatus information concerning the information processing apparatus to a server, the computer readable instructions, when executed by the computer, causing the computer to:

designate the information processing apparatus to transmit the apparatus information to the server; and based on the designation of the information processing apparatus, transmit a setting command to the designated information processing apparatus through the communication interface, the setting command commanding the information processing apparatus to shift to one of a condition for transmitting the apparatus information to the server and a condition for not transmitting the apparatus information to the server.

2. The computer readable storage medium according to claim 1,
wherein the computer readable instructions cause the computer to transmit a first command as the setting command to the designated information processing apparatus through the communication interface, the first command commanding the information processing apparatus to shift to a transmittable condition, the transmittable condition allowing the information processing apparatus to transmit the apparatus information to the server.

3. The computer readable storage medium according to claim 2,
wherein the computer readable instructions cause the computer to:
upon initial activation of the program in the operating terminal, receive through the operation interface one of agreement and disagreement from a user for transmission of the apparatus information from the information processing apparatus to the server; and
transmit the first command to the designated information processing apparatus in response to receipt of the agreement from the user for the transmission of the apparatus information.

4. The computer readable storage medium according to claim 2,
wherein the computer readable instructions cause the computer to:
receive a setting concerning transmission of the first command whether the first command is to be transmitted to the information processing apparatus; and
in response to receipt of the setting to allow the transmission of the first command, transmit the first command to the information processing apparatus.

5. The computer readable storage medium according to claim 4,
wherein the computer readable instructions cause the computer to:
obtain capability information indicating one of capableness and incapableness of the information processing apparatus to transmit the apparatus information to the server from the designated information processing apparatus; and
in a case where the obtained capability information indicates capableness of the designated information processing apparatus for the transmission of the apparatus information to the server, transmit the first command to the designated information processing apparatus.

6. The computer readable storage medium according to claim 5,
wherein the computer readable instructions cause the computer to:
in the case where the obtained capability information indicates capableness of the designated information processing apparatus for the transmission of the apparatus information to the server, display a setting interface in an operable mode in the display, the setting interface being configured to enable a first setting that allows the transmission of the first command to the designated information processing apparatus; and
in the case where the obtained capability information indicates incapableness of the designated information processing apparatus for the transmission of the apparatus information to the server, refrain from displaying the setting interface in the operable mode in the display,
wherein the computer is configured to receive a setting operation to the setting interface through the operation interface, and
wherein the computer readable instructions cause the computer to transmit the first command to the designated information processing apparatus in response to receipt of the first setting through the setting interface while the setting interface is being displayed in the operable mode in the display.

7. The computer readable storage medium according to claim 4,
wherein the computer readable instructions cause the computer to:
display a setting interface in the display, the setting interface being configured to enable one of a first setting that allows the transmission of the first command to the designated information processing apparatus and a second setting that allows transmission of a second command commanding the information processing apparatus to shift to a suspended condition, the suspended condition suspending the information processing apparatus from transmitting the apparatus information to the server,
wherein the computer is configured to receive entry of one of the first setting and the second setting in the setting interface through the operation interface, and
wherein the computer readable instructions cause the computer to:
in a case where the designated information processing apparatus is identical to a former information processing apparatus designated by the computer in the past, and in a case where the received setting being one of the first setting and the second setting coincides with a former setting being one of the first setting and the second setting in the former information processing apparatus, transmit neither the first command nor the second command to the designated information processing apparatus.

8. The computer readable storage medium according to claim 2,
wherein the computer readable instructions cause the computer to transmit a second command to the designated information processing apparatus through the communication interface, the second command commanding the information processing apparatus to shift to a suspended condition, the suspended condition suspending the information processing apparatus from transmitting the apparatus information to the server.

9. The computer readable storage medium according to claim 8,
wherein the computer readable instructions cause the computer to:
obtain an operation mode of the designated information processing apparatus;
based on the obtained operation mode of the designated information processing apparatus, determine whether the second command is to be transmitted to the designated information processing apparatus; and transmit the second command to the designated information processing apparatus based on the determination.

10. The computer readable storage medium according to claim 8, wherein the computer readable instructions cause the computer to, in response to the transmission of the second command to the designated information processing apparatus, transmit the second command to a former information processing apparatus having been designated by the computer in the past.

11. The computer readable storage medium according to claim 8, wherein the computer readable instructions cause the computer to:

determine whether the designated information processing apparatus is online or offline;

based on a determination that the designated information processing apparatus is offline, suspend the computer from transmitting the second command to the designated information processing apparatus while the designated information processing apparatus stays offline; and based on a determination that the designated information processing apparatus once stayed offline is online again, transmit the second command to the designated information processing apparatus.

12. The computer readable storage medium according to claim 8, wherein the computer readable instructions cause the computer to:

obtain condition information from the designated information processing apparatus, the condition information indicating whether the designated information processing apparatus is in the transmittable condition or the suspended condition; and based on the obtained condition information indicating that the designated information processing apparatus is in the suspended condition, suspend the computer from transmitting the second command to the designated information processing apparatus while the designated information processing apparatus is in the suspended condition.

13. The computer readable storage medium according to claim 8, wherein the computer readable instructions cause the computer to store command transmission history associated with identification of the information processing apparatus in a memory of the operating terminal, the command transmission history containing a record of the transmission of the second command from the operating terminal to the designated information processing apparatus.

14. The computer readable storage medium according to claim 13, wherein the computer readable instructions cause the computer to:

obtain condition information from the designated information processing apparatus, the condition information indicating whether the designated information processing apparatus is in the transmittable condition or the suspended condition; and based on the obtained condition information indicating that the designated information processing apparatus is a condition different from the condition of the designated information processing apparatus indicated in the command transmission history stored in the memory, suspend the computer from transmitting the first command to the designated information processing apparatus while the designated information processing apparatus is in the different condition.

15. The computer readable storage medium according to claim 13, wherein the computer readable instructions cause the computer to:

obtain condition information from the designated information processing apparatus, the condition information indicating whether the designated information processing apparatus is in the transmittable condition or the suspended condition; and based on the obtained condition information indicating that the designated information processing apparatus is a condition different from the condition of the designated information processing apparatus indicated in the command transmission history stored in the memory, suspend the computer from transmitting the second command to the designated information processing apparatus while the designated information processing apparatus is in the different condition.

16. The computer readable storage medium according to claim 2, wherein the computer readable instructions cause the computer to:

determine whether the designated information processing apparatus is online or offline; and based on a determination that the designated information processing apparatus is offline, suspend the computer from transmitting the first command to the designated information processing apparatus while the designated information processing apparatus stays offline.

17. The computer readable storage medium according to claim 16, wherein the computer readable instructions cause the computer to, based on the determination that the designated information processing apparatus is offline, refrain from displaying a setting interface in an operable mode in the display, the setting interface being configured to enable a first setting that allows the transmission of the first command to the designated information processing apparatus.

18. The computer readable storage medium according to claim 16, wherein the computer readable instructions cause the computer to, based on a determination that the designated information processing apparatus once stayed offline is online again, transmit the first command to the designated information processing apparatus.

19. The computer readable storage medium according to claim 2, wherein the computer readable instructions cause the computer to, in a case where the designated information processing apparatus is different from a former information processing apparatus designated by the computer in the past, transmit a second command to the former information processing apparatus through the communication interface, the second command commanding the information processing apparatus to shift to a suspended condition, the suspended condition suspending the information processing apparatus from transmitting the apparatus information to the server.

20. The computer readable storage medium according to claim 2,
wherein the computer readable instructions cause the computer to:
obtain condition information from the designated information processing apparatus, the condition information indicating whether the designated information processing apparatus is in the transmittable condition or a suspended condition, the suspended condition suspending the information processing apparatus from transmitting the apparatus information to the server; and
based on the obtained condition information indicating that the designated information processing apparatus is in the transmittable condition, suspend the computer from transmitting the first command to the designated information processing apparatus while the designated information processing apparatus is in the transmittable condition.

21. The computer readable storage medium according to claim 2,
wherein the computer readable instructions cause the computer to store command transmission history associated with identification of the information processing apparatus in a memory of the operating terminal, the command transmission history containing a record of the transmission of the first command from the operating terminal to the designated information processing apparatus.

22. The computer readable storage medium according to claim 21,
wherein the computer readable instructions cause the computer to:
obtain condition information from the designated information processing apparatus, the condition information indicating whether the information processing apparatus is in the transmittable condition, or a suspended condition, the suspended condition suspending the information processing apparatus from transmitting the apparatus information to the server; and
based on the obtained condition information indicating that the designated information processing apparatus is a condition different from the condition of the designated information processing apparatus indicated in the command transmission history stored in the memory, suspend the computer from transmitting the first command to the designated information processing apparatus while the designated information processing apparatus is in the different condition.

23. The computer readable storage medium according to claim 1,
wherein the information processing apparatus is a printer, and
wherein the apparatus information is information concerning history of operations in the printer.

24. An information processing apparatus, comprising:
a communication interface configured to communicate with a server and an operating terminal; and
a controller configured to:
receive a setting command from the operating terminal through the communication interface, the setting command commanding the information processing apparatus to shift to one of a condition for transmitting apparatus information to the server and a condition for not transmitting the apparatus information to the server; and
in response to receipt of the setting command from the operating terminal, shift to a commanded condition being one of the condition for transmitting the apparatus information to the server and the condition for not transmitting the apparatus information to the server.

25. A system, comprising:
an operating terminal comprising an operation interface, a terminal communication interface, and a terminal controller; and
an information processing apparatus comprising an apparatus communication interface and an apparatus controller,
wherein the terminal controller is configured to:
designate the information processing apparatus to transmit apparatus information to a server; and
based on the designation of the information processing apparatus, transmit a setting command to the designated information processing apparatus through the terminal communication interface, the setting command commanding the information processing apparatus to shift to one of a condition for transmitting the apparatus information to the server and a condition for not transmitting the apparatus information to the server, and
wherein the apparatus controller is configured to:
receive the setting command from the operating terminal through the apparatus communication interface; and
in response to receipt of the setting command from the operating terminal, shift to a commanded condition being one of the condition for transmitting the apparatus information to the server and the condition for not transmitting the apparatus information to the server.

* * * * *